(12) United States Patent
Schaekens et al.

(10) Patent No.: US 10,626,302 B2
(45) Date of Patent: Apr. 21, 2020

(54) NON-REACTIVE HOT-MELT ADHESIVE WITH LACTIDE-BASED COPOLYMER

(71) Applicant: PURAC BIOCHEM BV, Gorinchem (NL)

(72) Inventors: Chris François Hubert Schaekens, Gorinchem (NL); Kevin Bernardus Braam, Gorinchem (NL); Jessie Richarda Anna Verkerk, Gorinchem (NL)

(73) Assignee: PURAC BIOCHEM BV, Gorinchem (NL)

( * ) Notice: Subject to any disclaimer, the term of this patent is extended or adjusted under 35 U.S.C. 154(b) by 0 days.

(21) Appl. No.: 16/080,560

(22) PCT Filed: Mar. 1, 2017

(86) PCT No.: PCT/EP2017/054782
§ 371 (c)(1),
(2) Date: Aug. 28, 2018

(87) PCT Pub. No.: WO2017/149019
PCT Pub. Date: Sep. 8, 2017

(65) Prior Publication Data
US 2019/0092977 A1    Mar. 28, 2019

(30) Foreign Application Priority Data
Mar. 3, 2016  (EP) ..................... 16158479

(51) Int. Cl.
*C09J 5/06* (2006.01)
*C08G 63/08* (2006.01)
*C09J 167/04* (2006.01)

(52) U.S. Cl.
CPC ................ *C09J 5/06* (2013.01); *C08G 63/08* (2013.01); *C09J 167/04* (2013.01); *C09J 2467/00* (2013.01)

(58) Field of Classification Search
CPC ......................................... C09J 5/06
See application file for complete search history.

(56) References Cited

FOREIGN PATENT DOCUMENTS

| WO | 02/070583 A2 | 9/2002 | |
|---|---|---|---|
| WO | WO-02070583 A2 * | 9/2002 | ............. C08G 63/06 |
| WO | 2008/044651 A1 | 4/2008 | |
| WO | 2016/026859 A1 | 2/2016 | |
| WO | WO-2016026859 A1 * | 2/2016 | ............. C08G 63/08 |

OTHER PUBLICATIONS

May 26, 2017 International Search Report issued in International Patent Application No. PCT/EP2017/054782.
May 26, 2017 Written Opinion issued in International Patent Application No. PCT/EP2017/054782.

* cited by examiner

Primary Examiner — Daniel H Lee
(74) Attorney, Agent, or Firm — Oliff PLC

(57) ABSTRACT

A hot-melt adhesive includes a copolymer having first and second blocks, wherein the first block is an amorphous copolymer of lactic acid and a further polymerisable monomer and the second block is a polylactic acid polymer selected from poly-L-lactic acid (PLLA) and poly-D-lactic acid (PDLA), the first block having a number average molecular weight of at least 0.5 kg/mol and the second block having a number average molecular weight of at least 1 kg/mol. Preferably, the hot-melt adhesive also has 0.5-20 wt. %, calculated on the weight of the copolymer of a polylactic acid unit (PLAU) which has a stereochemistry which is opposite to the stereochemistry of the second block in the copolymer. The non-reactive hot-melt adhesive combines a good adhesive performance with storage stability resulting from a low cold-flow. Further, the adhesive is at least partially based on polymers which can be prepared from renewable resources.

14 Claims, No Drawings

NON-REACTIVE HOT-MELT ADHESIVE WITH LACTIDE-BASED COPOLYMER

The invention pertains to a non-reactive hot-melt adhesive with a specific lactide-based copolymer. The invention also pertains to the use of a specific lactide-based copolymer in a hot-melt adhesive, and to a method for adhering substrates together using a hot-melt adhesive comprising a specific lactide-based copolymer.

As used herein, "hot-melt adhesive" refers to a thermoplastic polymer composition that is heated to obtain a liquid of flowable viscosity, and after application to a substrate, cooled to obtain a solid. After the hot-melt adhesive solidifies upon cooling to a temperature below its melt temperature or below its solidification transition temperature, an adhesive bond is formed between the substrate and the adhesive material. As essentially no covalent chemical bonds are formed between the adhesive and the substrate upon which the adhesive is applied, the hot-melt adhesive may be referred to as a non-reactive hot-melt adhesive.

Hot-melt adhesives are often used to bond two substrates together so as to maintain the two substrates in a fixed relation to each other. Hot-melt adhesives are also used in articles that include a nonwoven layer to bond the nonwoven layer and a polymer film layer together. Hot-melt adhesives are further used to adhere packaging constructions e.g. bag, box, carton, case and tray together to construct the package, close the package or both. They are also used as pressure-sensitive adhesives for tapes and labels.

A non-reactive hot-melt adhesive has to meet a number of requirements to be suitable for commercial application.

In the first place, as will be evident, the adhesion properties of the adhesive upon use have to be good. Loss of adhesion can cause, e.g., opening of packages, which is unacceptable both during and after production.

Further, hot-melt adhesives are conventionally provided in the form of granules or pellets, which will be molten before use. These granules have to be stable during storage. That is, the granules cannot adhere to each other to a too large extent, as this will impede proper handling of the granules. To obtain this feature, it is important to ensure that the hot-melt adhesive does not show flow at room temperature.

A further important property of a hot-melt adhesive is the set time, that is, the time required by the adhesive to form a bond with the substrate. The set time is important in commercial operation, because it governs the time required to press the two substrates sandwiching the adhesive together. Set time may be of the order of seconds.

On the other hand, while the set time often has to be very short, the adhesive has to show some open time. The open time is the time after application of the adhesive at high temperature during which the adhesive still has flow properties. This is the time frame after application of the adhesive onto the carrying substrate during which the covering substrate can be applied while obtaining good adhesion.

A further property which may be desirable for hot-melt adhesives is a certain degree of biodegradability. Where the hot-melt adhesive is used in the manufacture of objects which are to be composted, it is important that the adhesive can be degraded within the same time frame as the rest of the object. This feature may be of particular relevancy where the hot-melt adhesive is used in the manufacture of packaging material.

Further, it is preferred for the hot-melt adhesive to be at least partially derivable from renewable resources.

There is need in the art for a non-reactive hot-melt adhesive which combines a good adhesive performance with a good storage stability resulting from a low cold-flow, and in some embodiments a sort set time, wherein the adhesive is at least partially based on polymers which can be prepared from renewable resources.

The present invention provides a hot-melt adhesive which shows desirable properties.

The present invention pertains to a hot-melt adhesive comprising a copolymer comprising a first block and a second block, wherein
   the first block is an amorphous copolymer of lactic acid and a further polymerisable monomer and
   the second block is a polylactic acid polymer selected from poly-L-lactic acid (PLLA) and poly-D-lactic acid (PDLA), the first block having a number average molecular weight of at least 0.5 kg/mol and the second block having a number average molecular weight of at least 1 kg/mol.

The lactic acid in the block copolymer of the present invention can be derived from renewable resources. Further, polylactic acid is biodegradable, and, depending on the nature of the other monomers in the copolymer, and on the further components in the hot-melt composition, a biodegradable composition may be obtained. Further, a hot-melt adhesive comprising the copolymer according to the invention combines a good adhesive performance with a good storage stability resulting from a low cold-flow, and may have a sort set time. Having a copolymer of two blocks instead of two separate polymers has the further advantage that said copolymer of two blocks can be manufactured in a one-vessel synthesis. Further advantages of the present invention and specific embodiments thereof will become apparent from the further specification.

The invention will be discussed in more detail below.

In the copolymer used in the present invention, the first block is an amorphous block while the second block is a crystalline block. When the block copolymer is used in a hot-melt composition, the combination of the amorphous and the crystalline block results in attractive properties. More specifically, the amorphous block is believed to ensure flexibility in the product, while the crystalline block is believed to provide a good cold flow resistance, heat resistance, and rigidity.

The first block in the block copolymer is an amorphous copolymer of lactic acid and a further polymerisable monomer. Suitable further polymerisable monomers are monomers which can polymerise with lactic acid (or lactide) to form a polymer. Examples of suitable monomers include glycolic acid, succinic acid, triethylene glycol, caprolactone, and other cyclical esters such as glycolide. The use of caprolactone is considered preferred as it has been found to give good results.

The lactic acid in the first block can be D-lactic acid, L-lactic acid, and combinations thereof. The use of L-lactic acid may be preferred in view of its wide availability.

In one embodiment the first block comprises 10-90 wt. % of monomer derived from lactic acid and 90-10 wt. % of further polymerisable monomer. Combinations of more than one type of further polymerisable monomer are also possible. It may be preferred for the first block to comprise 25-75 wt. % of monomer derived from lactic acid and 75-25 wt. % of further polymerisable monomer.

It is considered particularly preferred for the first block to comprise 25-75 wt. % of monomer derived from L-lactic acid and 75-25 wt. % of caprolactone.

The first block has a number average molecular weight of at least 0.5 kg/mol. If the molecular weight of the first block is too low, the advantageous properties of the polymer in hot-melt adhesives will not be obtained. It may be preferred for the number average molecular weight of the first block to be at least 1 kg/mol, in particular at least 2 kg/mol, more in particular at least 5 kg/mol. The upper limit of the molecular weight of the first block will depend on the viscosity of the final polymer, which should be kept in a manageable range. As a general maximum a value of 40 kg/mol may be mentioned. It may be preferred for the number average molecular weight of the first block to be at most 30 kg/mol, in particular at most 20 kg/mol.

The first block is an amorphous polymer. Within the context of the present specification, an amorphous polymer is a polymer which shows an enthalpy of melting of at most 2.0 J/gram. This can be determined via DSC. It is preferred for the amorphous copolymer in the block copolymer to have an enthalpy of melting of at most 1.0 J/gram, as a lower degree of crystallinity, as is evidenced from a lower enthalpy of melting, is believed to prevent the adhesive from becoming brittle and to result in a hot-melt adhesive with better adhesion properties. The enthalpy of melting of the first block can be determined after synthesis of the first block or, for an existing polymer, by synthesizing a replicate block.

The second block in the block copolymer is a polylactic acid polymer block selected from a poly-L-lactic acid (PLLA) block and a poly-D-lactic acid (PDLA) block.

Within the context of the present specification, the term polylactic acid polymer block (PLA) refers to a polymer block comprising at least 80 wt. % of lactic acid monomers, in particular at least 90 wt. %, more in particular at least 95 wt. % of lactic acid monomers. The polylactic acid polymer block always has a higher lactic acid contain that the first copolymer block, in general at least 10 wt. % higher, calculated on the weight of the total copolymer, in particular at least 15 wt. % higher.

Within the context of the present specification, a poly-L-lactic acid block (PLLA) is defined as a PLA in which at least 90% of the lactic acid monomers are L-lactic acid monomers, in particular at least 95%, more in particular at least 98%. Conversely, within the context of the present specification, a poly-D-lactic acid block (PDLA) is defined as a PLA in which at least 90% of the lactic acid monomers are D-lactic acid monomers, in particular at least 95%, more in particular at least 98%. For the effect of the present invention, higher percentages are preferred as they will result in an increased crystallinity of the PLA block, which contributes to the attractive properties of the hot-melt adhesive.

The second block has a number average molecular weight of at least 1 kg/mol. If the molecular weight of the first block is too low, the advantageous properties of the polymer in hot-melt adhesives will not be obtained. It may be preferred for the number average molecular weight of the second block to be at least 2 kg/mol.

The upper limit of the molecular weight of the second block is governed by the molecular weight of the total polymer. In general, the weight for the second block will be at most 50 kg/mol, in particular at most 30 kg/mol, in some embodiments at most 10 kg/mol.

The weight ratio between the first block in the copolymer and the second block in the copolymer generally is such that the second block makes up 10-90 wt. % of the total of first block and second block, in particular 15-80 wt. %. It may be preferred for the second block to make up 20-60 wt. % of the total weight of the polymer, in some embodiments 25-40 wt. %.

The molecular weight of the copolymer generally is between 2 and 100 kg/mol. If the molecular weight of the copolymer is too low, a hot-melt adhesive with good properties will not be obtained. If the molecular weight of the copolymer is too high, the viscosity of the composition may be too high for proper processability. It may be preferred for the molecular weight of the polymer to be in the range of 5-75 kg/mol, in particular 5-50 kg/mol, more in particular 10-30 kg/mol.

The copolymer may comprise further blocks which are neither amorphous copolymer of lactic acid and a further polymerisable monomer with a number average molecular weight of 2-20 kg/mol nor polylactic acid polymer selected from poly-L-lactic acid (PLLA) and poly-D-lactic acid (PDLA) with a number average molecular weight of 1-10 kg/mol. As such further blocks are not believed to contribute to the effect of the invention, it is preferred for the copolymer to be built up for at least 60 wt. % from first blocks and second blocks, in particular for at least 70 wt. %, more in particular for at least 80 wt. %, even more in particular for at least 90 wt. %. It is particularly preferred for the copolymer to consist of first and second blocks as described above.

The block copolymer used in the present invention is thermoplastic. Within the context of the present specification, the term thermoplastic polymer refers to a polymer which is solid at room temperature, becomes pliable, moldable, or liquid above a specific temperature, and returns to the solid state below said temperature, and wherein these heating and cooling steps can be repeated.

Within the context of the present specification, the term molecular weight is intended to refer to the number average molecular weight Mn, which is the statistical average molecular weight of all the polymer chains in the sample, and is defined by:

$$Mn = \frac{\Sigma NiMi}{\Sigma Ni}$$

where Mi is the molecular weight of a chain and Ni is the number of chains of that molecular weight. Mn can be predicted by polymerization mechanisms and is measured by methods that determine the number of molecules in a sample of a given weight; for example, colligative methods such as end-group assay. If Mn is quoted for a molecular weight distribution, there are equal numbers of molecules on either side of Mn in the distribution. In the context of the present specification Mn is determined by Relative Gel permeation chromatography (GPC) using chloroform as solvent and running phase, using polystyrene as a reference. Detection is via Refractive Index.

The molecular weight can be determined on the polymer during or after synthesis. When only the complete polymer is available, one can correlate back to the original structure with mass spectrometry (MS), NMR, LC, combined with differential scanning coulometry (DSC) and GPC.

The block copolymer can be obtained by sequential polymerisation wherein in a first step the monomers making up either the first or the second block are combined under polymerization conditions under formation of a polymer block. Then, monomers making up the other block are added to the polymer block under polymerization conditions resulting in the formation of the further polymer block, connected to the first formed block. It may be preferred to start with the synthesis of the amorphous block. It was found that the viscosity of the copolymer containing a first and second block (mutually chemically bonded) is less than the viscosity of a mixture of the individual first and second polymer blocks (mutually not chemically bonded). This has the advantage that the copolymer may be manufactured in less complex equipment than a mixture of the first and second polymer blocks.

As the first and second blocks are built up of polymers which are known in the art, it is within the scope of the skilled person to select polymerization conditions suitable to form the respective blocks. Suitable additives such as initiators and catalysts are also known in the art.

In one embodiment, the copolymer described above is combined in a hot-melt adhesive composition with a polylactic acid unit (PLAU) which has a stereochemistry which is opposite to the stereochemistry of at least one second block in the copolymer. In other words, if the second block is a PLLA block, the PLAU is PDLA unit. Conversely, if the second block is a PDLA block, the PLAU is a PLLA unit.

It has been found that the addition of such a further polylactic acid unit leads to a decreased set time, which is advantageous in many applications.

The PLAU, if used, is added in an amount of 0.5-20 wt. %, calculated on the weight of the total block copolymer.

In this embodiment of the invention, if the amount of PLAU is below 0.5 wt. %, calculated on the weight of the total block copolymer the decrease in set time of the composition is generally not be obtained. On the other hand, if the amount of PLAU is above 20 wt. %, its presence may start to interfere with the properties of the composition resulting, e.g., in a low-shear viscosity which is too high.

It may be preferred for the PLAU to be present in an amount of 1-10 wt. % of the block copolymer.

As indicated above, the PLAU has a stereochemistry which is opposite of that of the second block in the copolymer. While both PLLA and PDLA are viable options for the second block of the copolymer from a technical point of view, it may be preferred for the second block of the copolymer to be PLLA and the PLAU to be PDLA. This is because PLLA is derived from L-lactic acid, which is has a higher availability on the market than D-lactic acid. As there will be more of the second block in the composition than of the PLAU, the use of PLLA for the second block and PDLA for the PLAU is preferred. PLLA is defined as a PLA in which at least 90% of the lactic acid monomers are L-lactic acid monomers, in particular at least 95%, more in particular at least 98%. PDLA is defined as a PLA in which at least 90% of the lactic acid monomers are D-lactic acid monomers, in particular at least 95%, more in particular at least 98%. For the effect of the present invention, higher percentages are preferred.

The PLAU generally has a number average molecular weight of at least 0.75 kg/mol. If the Mn of the further lactic acid polymer is too low, the effect of reducing the set time will not be obtained to the desired extent.

The PLAU, if present, preferably has a Mn in the range of 0.75 to 10 kg/mol. When the Mn of the second further lactic acid polymer is too high, it may become difficult to ensure a homogeneous presence of the further lactic acid polymer in the adhesive composition. Further, the viscosity of the end product may become too high. On the other hand, an Mn which is higher than the lower limit of 0.75 kg/mol may help to reduce the set time of the composition. It may be preferred for the PLAU to have an Mn in the range of 1.5 to 7.5 kg/mol.

The PLAU that may be used in the composition according to the invention may be in the form of a PLLA or PDLA polymer. It is also possible, however, that the PLAU is present in a polymer which also encompasses other units. For example, a PLLA unit can be present as a block in a polymer which also comprises blocks of lactic acid polymer which contains less than 90% of units of a single type of stereochemistry. An example of such a block would be a block obtained by polymerization of meso-lactide (which contains 50% L-lactic acid monomer and 50% D-lactic acid monomer).

In general, the PLAU is present in a polymer which comprises at least 70 wt. % of monomers derived from lactic acid, either in the PLAU or in the polymer but not in the PLAU. It may be preferred for the PLAU to be present in a polymer which comprises at least 80 wt. % of monomers derived from lactic acid, in particular at least 90 wt. %.

In one embodiment, the PLAU is present in a polymer of which it makes up at least 80 wt. %, in particular at least 90 wt. %.

The hot-melt composition can comprise additives known in the art for addition to hot-melt adhesive compositions. Suitable additives include tackifiers which improve the adhesion properties of the composition, plasticizers to reduce the Tg of the composition, waxes to help to improve the set time and reduce the viscosity, oils to adjust the viscosity, fillers to provide volume to the composition, stabilisers such as antioxidants to increase the stability of the composition, coloring agents, rheology agents to adjust flow behavior, etc.

These components and their effects are known in the art, and require no further elucidation here.

The adhesive composition can be manufactured by combining the various ingredients in the liquid phase.

In one embodiment, in a first step the block copolymer is provided in the liquid phase, and the further components of the composition, for example the further polylactic acid, if used, and, if used, one or more of the additional components described above, are added thereto, either in the solid phase or in the liquid phase, to form a liquid composition.

The further lactic acid polymer, if used, is preferably added in the liquid phase at relatively high temperature under mixing conditions which ensure fast mixing of the components.

It may be preferred for the block copolymer and, if present, the PLAU described above together to make up at least 50 wt. % of the non-reactive hot-melt adhesive, preferably at least 60 wt. %, more in particular at least 70 wt. %, even more in particular at least 80 wt. %. In some embodiments the hot-melt adhesive consists for at least 90 wt. % of the total of block copolymer and, if present, PLAU, or even for at least 95 wt. %.

The invention also pertains to the use of the non-reactive hot-melt adhesive composition according to the invention to bond substrates together. The invention thus also pertains to a method for arranging substrates in a fixed position with respect to each other, comprising the steps of applying an amount of a non-reactive hot-melt adhesive composition as described above in liquid form onto a surface of a first substrate, applying a surface of a second substrate onto the amount of non-reactive hot-melt adhesive composition, and cooling the assembly of substrates and non-reactive hot-melt adhesive composition to a temperature below the melting point of the non-reactive hot-melt adhesive composition.

The hot-melt adhesive compositions of this invention are suitable for adhering a wide variety of substrates together. Suitable substrates include are cardboard or paper substrates, optionally provided with a layer of a polymer coating material, e.g. a polyolefin, more preferably a polyethylene, or a polylactide. Suitable substrates also include plastics, in particular objects of, e.g., polyolefins or polylactic acid, textiles, foils used in packaging, e.g., the foils used in packaging flowers or plants, but also carpet backings. Suitable substrates further include metal foils.

In one embodiment, the substrates are part of a package.

Due to its potential biodegradability the adhesive composition according to the invention is particularly attractive for use in the adhesion of substrates which are in themselves biodegradable, e.g., cellulose-based substrates such as paper and cardboard, and biodegradable plastic substrates, such as substrates comprising polylactic acid polymers.

It will be clear to the skilled person that various embodiments of the present invention can be combined, unless they are mutually exclusive.

The present invention is illustrated by the following example, without being limited thereto or thereby.

EXAMPLE 1: POLYMER SYNTHESIS AND PROPERTIES

Copolymers comprising a first block of an amorphous ε-caprolactone/lactic acid polymer and a second block of poly-L-lactic acid were synthesized as follows:

In a reaction vessel amounts of L-lactide (commercially available from Corbion Purac under the trade name Puralact B3, degree of optical purity >95%) and ε-caprolactone (available from Perstorp UK) were combined at room temperature with 1-hexadecanol used as polymerization initiator and 0.20 wt. % of anti-oxidant Irgafos 126 (BASF). The vessel was flushed repeatedly with nitrogen. The reaction mixture was heated to 160° C. with a rate of about 5° C./min. When stirring became possible due to melting of the solids, the mixture was stirred at 150 to 200 rpm. When the temperature of the mixture reached 160° C., 50 ppm of tin(II)ethyl hexanoate as catalyst was added. The temperature was increased to 180° C. at a rate of about 5° C./min. When the temperature reached 180° C. the reaction temperature is reached. This point is set as t=0.

At t=2 h and t=3.5 h a further amount of 50 ppm of catalyst was added. The reaction was allowed to continue under continued mixing at a maximum speed of 400 rpm. The reaction was continued for 4 hours at 180° C., and then overnight at 160° C. This resulted in the synthesis of the first block, the composition of which was confirmed by GPC, LC, and DCS analysis.

To synthesize the second block, an additional amount of lactide monomer was added, and the tin(II)ethyl hexanoate catalyst concentration was adjusted to 150 ppm. The reaction temperature was kept at 160° C. After 2.5 hours, 225 ppm of the catalyst deactivator ADK STAB AX-71 was added. The mixture was allowed to react for 30 minutes at 300 to 400 rpm. After 30 minutes, vacuum was applied for 1 hour to remove excess free monomer and nitrogen from the product. Then, vacuum was released and 1.0 wt. % thermal stabilizer Stabaxol I was added. The mixture was maintained for 30 minutes at 300-400 rpm. Then, the product was removed from the reaction vessel, and allowed to cool to room temperature. DSC analysis was performed with the following program on a TA Instrument Q-series DSC 2000: −50° C., 10° C./min to 180° C., −10° C./min to −50° C., 10° C./min to 180° C.

The composition and properties of various polymers manufactured in the above-described manner are presented in Table 1 below:

TABLE 1

| Sample | Size amorphous block (Mn, kg/mol) | Lactide content in amorphous block (wt. %) | Size PLA block (Mn, kg/mol) | Tg (° C.) | Tm (° C.) | Tc (° C.) | Tm enthalpy (J/g) |
|---|---|---|---|---|---|---|---|
| 1 | 9 | 60 | 3.5 | 4.8 | 134.4 | 98.1 | 10.5 |
| 2 | 12 | 50 | 4 | −19.3 | 122.8 | NA | 9.7 |
| 3 | 14 | 50 | 6 | −16.2 | 138.0 | 81.6 | 15.0 |

EXAMPLE 2: ADHESIVE COMPOSITIONS AND TESTS

Formulations were made from the following starting materials: As thermoplastic resin a block copolymer of caprolactone and lactic acid was used, comprising a first block of 12 kg/mol with a monomer weight ratio of 50:50 caprolactone:L-lactic acid, and a second block of PLLA of 4 kg/mol. The copolymer had a molecular weight Mn of 16 kg/mol. The polymer was prepared via the process described in Example 1. Additionally, as PLAU, a PDLA (initiated with cetyl alcohol) was used with a Mn of 2.0 kg/mol. The Mn was determined by means of chromatographic techniques.

Three compositions were prepared, namely composition A, which contained the copolymer but not the PLAU and compositions B and C, both of which contain the copolymer and different amounts of PLAU. All compositions were prepared by mixing the thermoplastic resin with the PLAU in the liquid phase until a homogeneous mixture was obtained under stirring.

The compositions were tested according to a manual method as follows: A line with a length of 50 mm of the adhesive formulation to be tested was applied at 165° C. onto a corrugated cardboard substrate, perpendicular to the corrugated structure of the cardboard. Within one second the cardboard was folded, thereby applying the second substrate, and medium pressure was applied to the bond. After a specific set time, the pressure was relieved and the bond was torn apart. The bond was then evaluated to check whether at least 50% fiber tear was achieved and whether the adhesive remained intact. This test was repeatedly performed to find the set time, that is, the shortest time at which 50% fiber tear was obtained. When narrowing the experiment down to within 1 second of the set time, the test was done in triplicate to confirm. Small variations were accepted as it was a manual test.

TABLE 2

| | Copolymer (wt. %) | PLA (wt. %) | Set time (s) |
|---|---|---|---|
| A | 100 | — | 30-40 |
| B | 99.0 | 1.0 | 15-20 |
| C | 97.0 | 3.0 | 5-8 |

As can be seen from Table 2, Compositions B and C, which contain both the PLAU show a set time which was substantially improved as compared to the set time of composition A. Composition C, which had a slightly higher content of PLAU than Composition B, had a set time which is even lower.

The invention claimed is:

1. A hot-melt adhesive comprising a copolymer comprising a first block and a second block, wherein
   the first block is an amorphous copolymer of lactic acid and a further polymerizable monomer and
   the second block is a polylactic acid polymer selected from poly-L-lactic acid (PLLA) and poly-D-lactic acid (PDLA),
   the first block has a number average molecular weight of at least 0.5 kg/mol and the second block has a number average molecular weight of at least 1 kg/mol.

2. The hot-melt adhesive according to claim 1, wherein the further polymerizable monomer is selected from glycolic acid, succinic acid, triethylene glycol, caprolactone, and further cyclic ester monomers, and mixtures thereof.

3. The hot-melt adhesive according to claim 1 wherein the first block comprises 10-90 wt. % of monomer derived from lactic acid.

4. The hot-melt adhesive according to claim 1 wherein the ratio between the first block in the copolymer and the second block in the copolymer is such that the second block makes up 10-90 wt. % of the total of first block and second block, with the number average molecular weight of the first block being at least 1 kg/mol, and the number average molecular weight of the second block being 1-10 kg/mol.

5. The hot-melt adhesive according to claim 1 wherein the copolymer has a number average molecular weight in the range of 2-70 kg/mol.

6. The hot-melt adhesive according to claim 1, which further comprises 0.5-20 wt. %, calculated on the weight of the copolymer, of a polylactic acid unit (PLAU) that has a stereochemistry that is opposite to the stereochemistry of the second block in the copolymer.

7. The hot-melt adhesive according to claim 6, wherein the PLAU has a Mn in the range of 0.75 to 10 kg/mol.

8. The hot-melt adhesive according to claim 6, wherein the copolymer and the PLAU, if present, together make up at least 50 wt. % of the adhesive.

9. The hot-melt adhesive according to claim 1, wherein the copolymer makes up at least 50 wt. % of the adhesive.

10. A method for manufacturing the hot-melt adhesive according to claim 1, comprising:
    obtaining the block copolymer in a liquid phase; and
    adding one or more further components in a solid phase or the liquid phase to form a liquid composition, wherein
    the further component is at least one selected from the group consisting of tackifiers, plasticizers, waxes, oils, fillers, stabilizers, coloring agents, rheology agents, and/or PLAU.

11. A method for arranging substrates in a fixed position with respect to each other, comprising:
    applying an amount of the hot-melt adhesive according to claim 1 in liquid form onto a surface of a first substrate,
    applying a surface of a second substrate onto the amount of hot-melt adhesive composition, and
    cooling the assembly of substrates and hot-melt adhesive composition to a temperature below the melting point of the hot-melt adhesive composition.

12. A method comprising adhering substrates with a non-reactive hot-melt adhesive of a copolymer comprising a first block and a second block, wherein
    the first block is an amorphous copolymer of lactic acid and a further polymerizable monomer and
    the second block is a polylactic acid polymer selected from poly-L-lactic acid (PLLA) and poly-D-lactic acid (PDLA),
    the first block has a number average molecular weight of at least 0.5 kg/mol and the second block haste a number average molecular weight of at least 1 kg/mol.

13. The method according to claim 12, wherein the further polymerizable monomer is selected from glycolic acid, succinic acid, triethylene glycol, caprolactone, and further cyclic ester monomers, and mixtures thereof, the first block comprising 10-90 wt. % of monomer derived from lactic acid, and 90-10 wt. % of the further polymerizable monomer.

14. The method according to claim 12, wherein the ratio between the first block in the copolymer and the second block in the copolymer is such that the second block makes up 10-90 wt. % of the total of first block and second block, with the number average molecular weight of the first block being at least 1 kg/mol, and the number average molecular weight of the second block being 1-10 kg/mol, and wherein the copolymer has a number average molecular weight in the range of 2-70 kg/mol.

* * * * *